United States Patent
Bastide et al.

(10) Patent No.: US 9,330,378 B2
(45) Date of Patent: May 3, 2016

(54) MANAGEMENT AND SYNCHRONIZATION OF RELATED ELECTRONIC COMMUNICATIONS

(75) Inventors: Paul R. Bastide, Boxford, MA (US); Matthew E. Broomhall, South Burlington, VT (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 13/438,292

(22) Filed: Apr. 3, 2012

(65) Prior Publication Data
US 2013/0262594 A1    Oct. 3, 2013

(51) Int. Cl.
*G06F 15/16*    (2006.01)
*G06Q 10/10*    (2012.01)
*H04L 29/08*    (2006.01)

(52) U.S. Cl.
CPC .............. *G06Q 10/101* (2013.01); *H04L 67/22* (2013.01)

(58) Field of Classification Search
CPC .......... G06F 17/3089; G06F 17/30693; G06F 17/30699; G06F 3/048; G06Q 10/10; G06Q 30/02; G06Q 50/01; G06Q 99/00; H04L 12/1818; H04L 65/403; H04L 12/1831; H04L 29/06027; H04L 51/04; H04L 67/22; H04M 3/564
USPC ........................................................ 709/206
See application file for complete search history.

(56) References Cited

U.S. PATENT DOCUMENTS

| 7,110,514 | B2 |   | 9/2006  | Brown et al. |         |
|-----------|----|---|---------|--------------|---------|
| 7,480,259 | B2 |   | 1/2009  | Covell et al. |        |
| 8,020,105 | B1 | * | 9/2011  | Lemay et al. | 715/746 |
| 8,161,106 | B2 | * | 4/2012  | Quinn et al. | 709/204 |
| 8,775,532 | B1 | * | 7/2014  | Kumar et al. | 709/206 |
| 2002/0099775 | A1 | * | 7/2002 | Gupta et al. | 709/205 |
| 2004/0224772 | A1 | * | 11/2004 | Canessa et al. | 463/42 |
| 2006/0031331 | A1 | * | 2/2006 | LoBuono et al. | 709/206 |
| 2006/0101119 | A1 | * | 5/2006 | Qureshi et al. | 709/206 |
| 2006/0168026 | A1 | * | 7/2006 | Keohane et al. | 709/206 |
| 2006/0190546 | A1 | * | 8/2006 | Daniell | 709/206 |

(Continued)

OTHER PUBLICATIONS

Apache Software Foundation, "Apache Wave—About Apache Wave" [online]. Copyright © 2010 The Apache Software Foundation, [retrieved on Mar. 26, 2012]. Retrieved from the internet:<URL: http://incubator.apache.org/wave/about.html>.

(Continued)

*Primary Examiner* — Kevin Bates
*Assistant Examiner* — Ronak Patel
(74) *Attorney, Agent, or Firm* — Edward J. Wixted, III; Noah A. Sharkan (57) ABSTRACT

Embodiments of the present invention provide a system, method, and program product for managing and synchronizing electronic communications having one or more common topics. A computer system detects a first electronic communication involving a first user and a first set of users. The computer system analyzes the first electronic communication to identify a topic and determines whether the identified topic matches a topic of a second electronic communication involving the first user and a second set of users. Responsive to the identified topic of the first electronic communication matching a topic of the second electronic communication, the computer system provides to the first user an option to initiate an electronic communication involving the first user and the first and second sets of users.

20 Claims, 5 Drawing Sheets

(56) References Cited

U.S. PATENT DOCUMENTS

| | | |
|---|---|---|
| 2007/0143128 A1 | 6/2007 | Tokarev et al. |
| 2008/0208984 A1* | 8/2008 | Rosenberg et al. ............ 709/206 |
| 2009/0143052 A1* | 6/2009 | Bates et al. ................. 455/414.2 |
| 2009/0187831 A1* | 7/2009 | Tiwana et al. ................. 715/752 |
| 2009/0234876 A1* | 9/2009 | Schigel ............. G06F 17/30873 |
| 2009/0265255 A1* | 10/2009 | Jackson et al. .................. 705/27 |
| 2010/0005268 A1* | 1/2010 | Yang et al. .................... 711/202 |
| 2010/0100621 A1* | 4/2010 | O'Connell et al. ........... 709/224 |
| 2010/0205544 A1 | 8/2010 | Brzeski et al. |
| 2010/0223335 A1* | 9/2010 | Fu et al. ........................ 709/205 |
| 2010/0228777 A1 | 9/2010 | Imig et al. |
| 2010/0306122 A1* | 12/2010 | Shaffer ......................... 705/319 |
| 2011/0150198 A1 | 6/2011 | Walsh et al. |
| 2013/0031185 A1* | 1/2013 | Wyatt ............................ 709/206 |
| 2013/0055161 A1* | 2/2013 | Adams et al. ................. 715/811 |

OTHER PUBLICATIONS

Apache UIMA Development Community, "UIMA Overview and SDK Setup" [online]. Nov. 2011, Version 2.4.0, [retrieved on Mar. 26, 2012]. Retrieved from the internet:<URL: http://uima.apache.org/d/uimaj-2.4.0/overview_and_setup.pdf> Chapter 2, pp. 17-30.

Disclosed Anonymously, "Interactive Chat History", Aug. 8, 2011, IP.com [online], [retrieved on Oct. 21, 2011]. Retrieved from: Prior Art Database, IP.com No. IPCOM000209466D.

\* cited by examiner

FIG. 5 and synchronizing related electronic communications in accordance with another embodiment of the present invention.

MANAGEMENT AND SYNCHRONIZATION OF RELATED ELECTRONIC COMMUNICATIONS

TECHNICAL FIELD

The present invention relates generally to electronic communications and, more particularly, to managing and synchronizing electronic communications.

BACKGROUND

Electronic communications are widely utilized in both personal and business contexts. In business contexts, electronic communication media such as e-mail, instant messaging, chat messaging, and web forums can enable groups of individuals to collaborate on business projects, access each other's expertise, and exchange information pertaining to one or more shared interests.

Some electronic communication media, such as chat messaging and voice-over-ip (VOIP) conference calls, permit a group of individuals to concurrently participate in a single electronic communication. However, when collaborating on a project or otherwise working within a group, an individual can often be involved in many related electronic communications with different members of the group via different electronic communication media. Exchanging information in such a piecemeal manner can become difficult for the individual to track. Further, maintaining separate electronic communications that are potentially of interest to the whole group can hinder each member's awareness of the communications and ability to participate, which can result in miscommunications, duplicative efforts, and waste of time and resources.

SUMMARY

Embodiments of the present invention provide a system, method, and program product for managing and synchronizing electronic communications having one or more common topics. A computer system detects a first electronic communication involving a first user and a first set of users that has been brought into active view on a user interface of the computer system. The computer system analyzes the first electronic communication to identify a topic of the first electronic communication. The computer system determines whether the identified topic of the first electronic communication matches a topic of a second electronic communication involving the first user and a second set of one or more users. Responsive to the identified topic of the first electronic communication matching a topic of the second electronic communication, the computer system provides to the first user an option to initiate an electronic communication involving the first user and the first and second sets of one or more users.

DETAILED DESCRIPTION

Embodiments of the present invention will now be described in detail with reference to the accompanying drawings.

Figure 1:
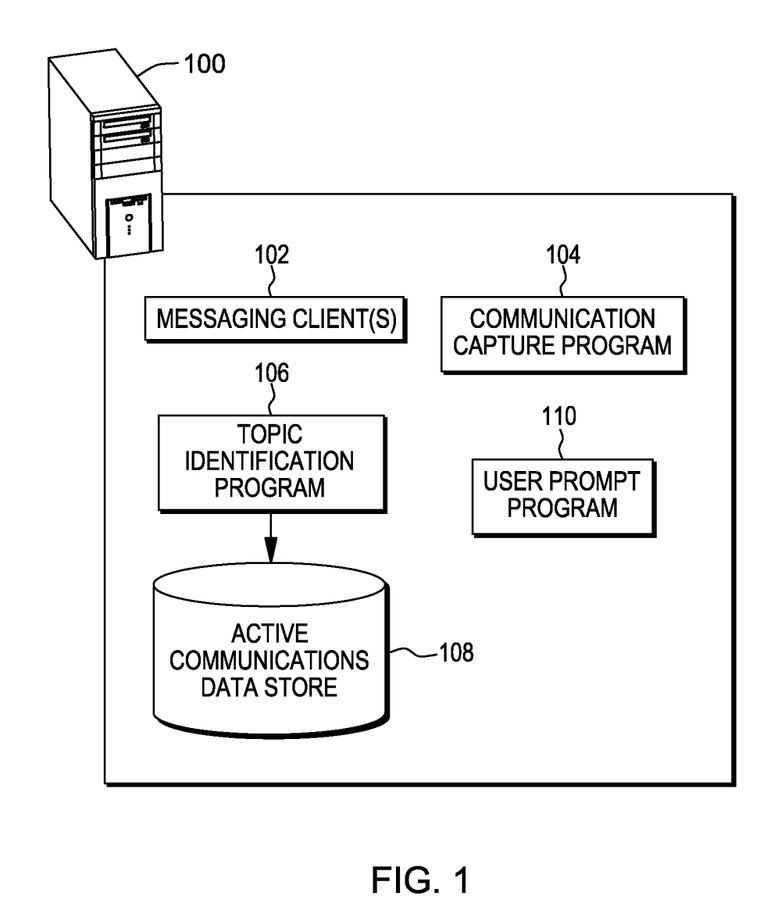
FIG. 1 is a functional block diagram of a computer system in accordance with an embodiment of the present invention.

FIG. 1 is a functional block diagram of a computer system 100 in accordance with an embodiment of the present invention. Computer system 100 can be a laptop computer, desktop computer, specialized computer server, or any other computer system known in the art. In general, computer system 100 can be any programmable electronic device as described in further detail with regard to FIG. 5.

Computer system 100 includes one or more messaging clients 102, communication capture program 104, topic identification program 106, active communications data store 108 and user prompt program 110. One or more messaging clients 102 are one or more programs that operate to enable a user to create, view, send and/or receive an electronic communication via a plurality of electronic communication media in accordance with embodiments of the present invention. For example, one or more messaging clients 102 can support electronic communications via e-mail, instant messaging, chat messaging, short message service (SMS) and multimedia messaging service (MMS) text messaging, web forums, and VOIP telephone calls. In a preferred embodiment, one or more messaging clients 102 are implemented using existing software. One or more messaging clients 102 can be implemented as dedicated local software applications and/or as web applications in conjunction with web browsing software. For example, e-mail, instant messaging, web forum, VOIP, text messaging, and chat messaging web applications can be provided within web browsing software via a remote server computer and network.

Figure 2:
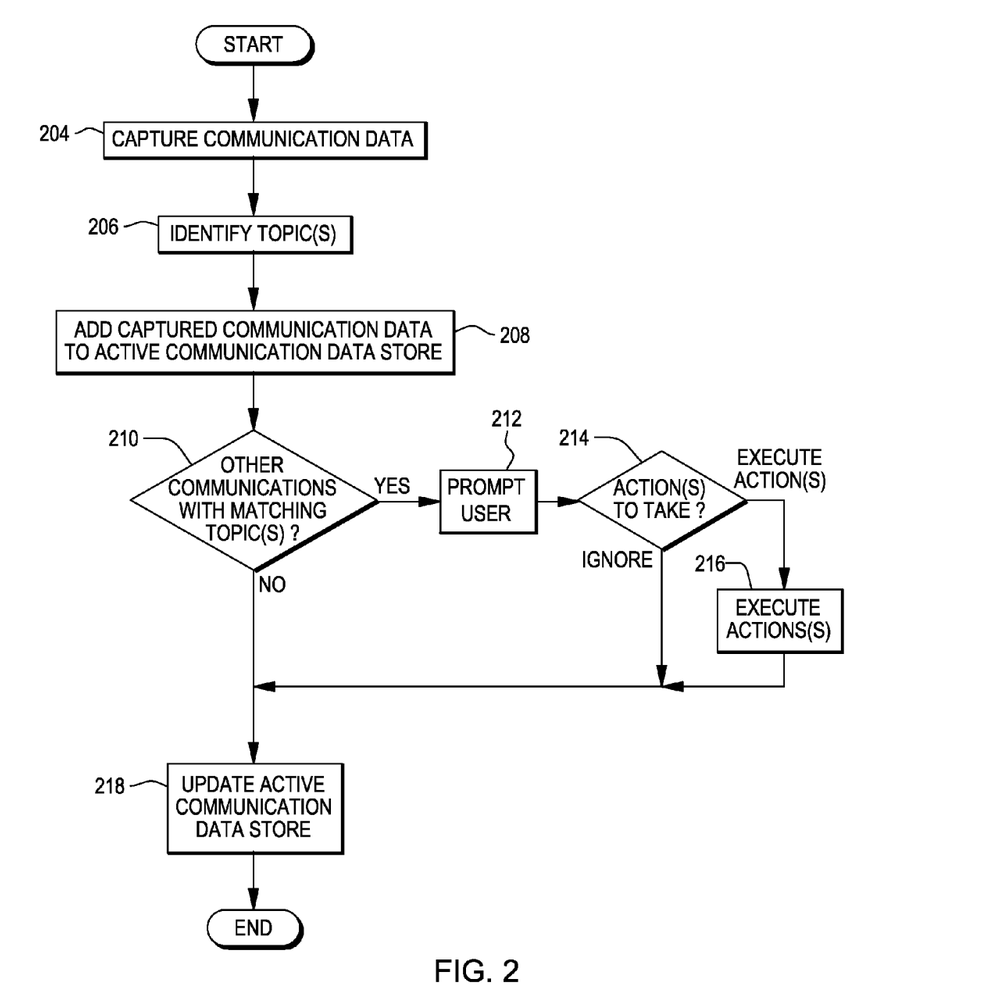
FIG. 2 is a flowchart illustrating operational steps for managing and synchronizing related electronic communications in accordance with an embodiment of the present invention.
Figure 3:
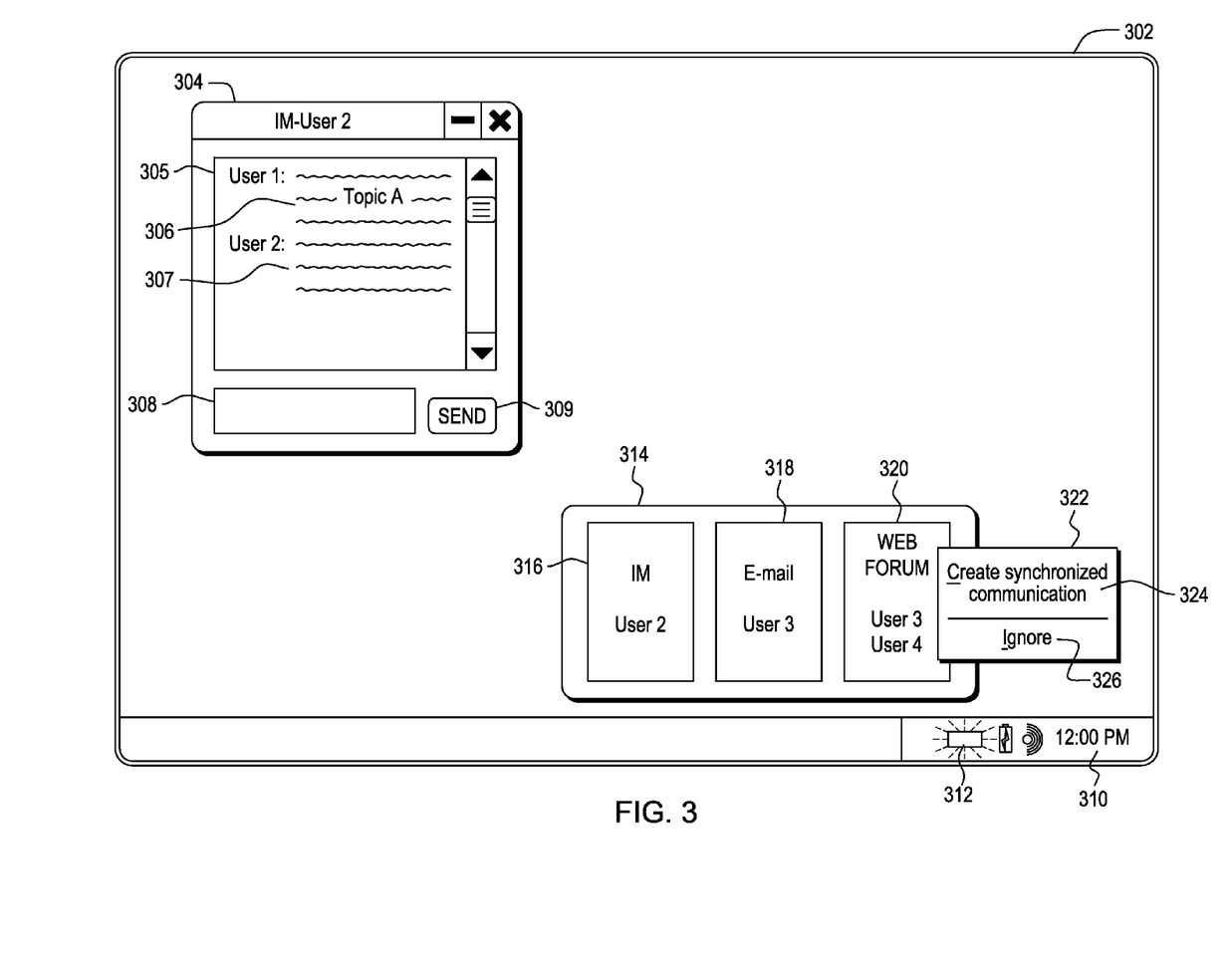
FIG. 3 shows an illustration of a user interface for managing and synchronizing related electronic communications in accordance with an embodiment of the present invention.
Figure 4:
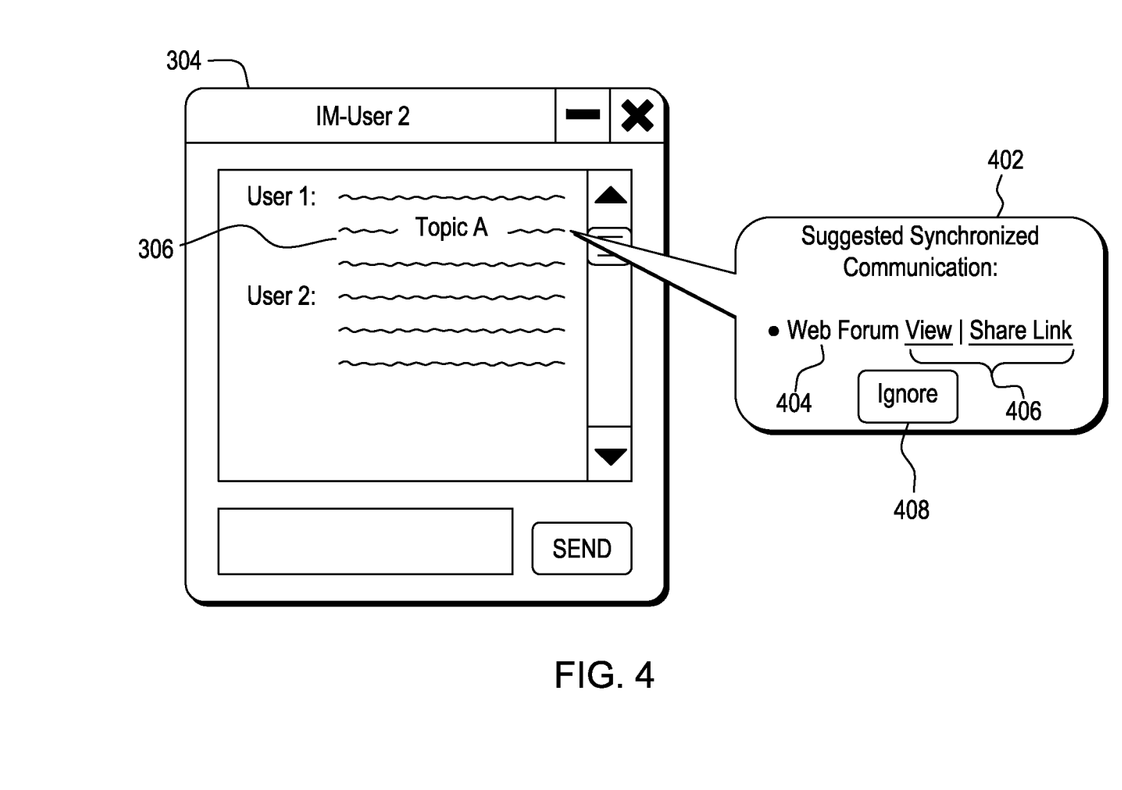
FIG. 4 shows an illustration of a user interface for managing and synchronizing related electronic communications in accordance with another embodiment of the present invention.

As discussed in greater detail with regard to FIGS. 2 through 4, communication capture program 104, topic identification program 106, active communications data store 108, and user prompt program 110 are utilized to identify electronic communications a user of computer system 100 has created, viewed, sent and/or received using one or more messaging clients 102 that have one or more common topics, and provide to the user one or more options to manage and synchronize those communications.

It should be understood that, for illustrative purposes, FIG. 1 does not show other elements which may be present when implementing an embodiment of the present invention such as, for example, a network and additional computer systems with which other users can send and receive electronic communications.

FIG. 2 is a flowchart illustrating operational steps for managing and synchronizing related electronic communications in accordance with an embodiment of the present invention. In step 204, communication capture program 104 captures data associated with an electronic communication a user of computer system 100 has created, viewed, sent and/or received using one or more messaging clients 102 ("communication data"). In a preferred embodiment, the communication data includes at least the message content of the electronic communication, information that identifies the medium of the electronic communication, and information that identifies the users involved in the electronic communication.

In a preferred embodiment, communication capture program 104 captures the communication data when the electronic communication is in active view on a user interface on computer system 100. For example, depending on the medium of the electronic communication, an electronic communication can be in active view in a graphical window or form generated by one or messaging clients 102 when the user opens and views a received e-mail message, views a web forum, or when the user is having an instant messaging conversation with other users.

Communication capture program 104 can utilize different techniques to capture the communication data. In one embodiment, communication capture program 104 is integrated with one or more messaging clients 102 and captures the communication data from the appropriate regions of graphical windows or forms that are generated by one or more messaging clients 102. Such regions may vary depending on the medium of the electronic communication and the layout of the particular graphical window or form. For example, with regard to e-mail, communication capture program 104 can capture message content from "body" and "subject" regions of the e-mail message and information identifying the users involved in the electronic communication from a "recipient" region. For an electronic communication brought into active view as an HTML or XML document, the communication data can be captured by detecting a document object model (DOM) of the electronic communication and extracting communication data from the appropriate nodes (e.g., text nodes). In another embodiment, communication data can be captured by taking a screenshot of the electronic communication in active view and using optical character recognition (OCR) to convert the screenshot of the electronic communication into alphanumeric text data.

In step 206, topic identification program 106 receives the captured communication data from communication capture program 104 and analyzes the communication data to identify one or more topics of the electronic communication. For example, identified topics might pertain to one or more persons, places, objects, activities, subjects and concepts. In a preferred embodiment, topic identification program 106 is implemented using one or more analysis engines in accordance with an unstructured information management architecture (UIMA). The analysis engines can each contain one or more annotators and can utilize various analysis technologies such as, for example, natural language processing algorithms, machine learning, and ontologies. The analysis engines can be publically available analysis engines, custom analysis engines, or combinations of both.

After identifying one or more topics of the electronic communication, in step 208, topic identification program 106 adds the captured communication data and its identified one or more topics (collectively, the "present electronic communication") to active communications data store 108. Active communications data store 108 is used to store an ongoing record of electronic communications the user has created, viewed, sent and/or received using one or more messaging clients 102. Active communications data store 108 can therefore contain other electronic communications that were also captured, analyzed to identify one or more topics thereof, and added to active communications data store 108 at some point in time prior to the present electronic communication.

In step 210, topic identification program 106 determines whether the identified one or more topics of the present electronic communication match one or more topics of any other electronic communications that are stored in active communications data store 108.

If topic identification program 106 determines that the identified one or more topics of the present electronic communication do not match one or more topics of any other electronic communications in active communications data store 108, then, in step 218, topic identification program 106 updates active communications data store 108 to remove any electronic communications that have been stored beyond a specified time limit. An administrative user of computer system 100 can specify the time limit on the basis of how long captured and stored electronic communications should be considered active. For example, an administrative user of computer system 100 can specify that electronic communications should be removed from active communications data store 108 two hours after being added. In another embodiment, removal of electronic communications from active communications data store 108 can be based on the number of occurrences of electronic communications pertaining to the same one or more topics (i.e., the frequency of the user's discussion of one or more topics) or another measure of seeming importance of certain electronic communications. For example, if the number of electronic communications pertaining to a particular topic exceeds a specified threshold number, those electronic communications can be associated with a longer time limit such that they are retained in active communications data store 108 for a longer period of time.

If, in step 210, topic identification program 106 determines that the identified one or more topics of the present electronic communication do match one or more topics of other electronic communications, then topic identification program 106 calls user prompt program 110.

In step 212, user prompt program 110 receives from topic identification program 106 the communication data of the electronic communications whose topics match one or more topics of the present electronic communication ("related electronic communications"), and prompts the user with one or more notifications. In one embodiment, visual notifications are displayed to the user using a system tray and graphical windows, as illustrated and discussed in greater detail with regard to FIG. 3. In another embodiment, visual notifications are displayed to the user in-line with the electronic communication that is in active view, as illustrated and discussed in greater detail with regard to FIG. 4.

The one or more notifications can include one or more options the user can select to manage and synchronize the related electronic communications. For example, the notifications can include selectable elements such as command buttons, menu options, or hyperlinks that, when selected by the user, execute actions to view the related electronic communications, transmit a link to an electronic communication to the users involved in the related electronic communications, or initiate a synchronized electronic communication between the users involved in the related electronic communications. Initiating a synchronized electronic communication can involve, for example, transmitting an e-mail message, instant message, or invitation for an electronic chat session or VOIP telephone conference call.

In another embodiment of the present invention, user prompt program 110 can identify an electronic communication medium that can be accessed by the users involved in the related electronic communications and suggest initiating a synchronized electronic communication in that medium or transmitting a link to an electronic communication which is in that medium. For example, if one or more of the users involved in the related electronic communications do not exist in the user's instant messaging contact list, user prompt program 110 can suggest that the user initiate a synchronized electronic communication in a different electronic communication medium, such as in an e-mail message or a web forum. If, for example, a related electronic communication is in a web forum, user prompt program 110 can suggest transmitting a URL link to that web forum to the users.

In step 214, user prompt program 110 receives from the user instructions on how to proceed in response to the displayed one or more notifications. In this exemplary embodiment, the user may decide to ignore the notification or select a selectable element to execute one or more of the aforementioned actions. If the user decides to ignore the notification, user prompt program 110 hides the displayed one or more notifications and, in step 218, topic identification program 106 updates active communications data store 108 as previously discussed. If the user decides to select a selectable element, user prompt program 110 executes the corresponding actions in step 216 and, in step 218, topic identification program 106 updates active communications data store 108 as previously discussed. For example, if the user selects a selectable element to view the related electronic communications, user prompt program 110 can bring the related electronic communications into active view. If the user selects a selectable element to initiate a synchronized communication, user prompt program 110 can execute a script to create a new electronic communication with the appropriate one or more messaging clients 102, pre-populate the electronic communication with communication data (e.g., the users' electronic addresses or user names, and message content pertaining to the matched one or more topics), and transmit the electronic communication to the users. User prompt program 110 can also redact certain content from any electronic communication transmitted to the other users or wholly prevent transmission on the basis of specified parameters. For example, user prompt program 110 can redact content if it pertains to a sensitive topic, or user prompt program 110 can prevent transmission of an electronic communication via a particular medium if the electronic communication would be exiting a domain of secure control.

Operational steps 204 through 218 are illustrative of one or more embodiments of the present invention. It should be understood that the content of each step, as well as the order of operation, can be modified without departing from the spirit and intended scope of the present invention.

FIG. 3 shows an illustration of a user interface operated by a hypothetical user to manage and synchronize related electronic communications in accordance with an embodiment of the present invention. Shown is a desktop environment 302 of computer system 100 operated by User 1. Instant messaging window 304 is in active view and contains an electronic communication involving User 1 and User 2. Instant messaging window 304 includes a message region 305, composition region 308, and send button 309. Message region 305 contains message 306, which represents a message transmitted to User 2 pertaining, in whole or in part, to a particular topic (Topic A), and message 307, which represents User 2's response.

In this example scenario, communication capture program 104 has captured the communication between User 1 and User 2, topic identification program 106 has identified Topic A as a topic of the electronic communication, and topic identification program 106 has identified three related electronic communications (i.e., three other electronic communications in active communications data store 108 that share Topic A). The three related electronic communications include another electronic communication via instant messaging involving User 1 and User 2, an electronic communication via e-mail involving User 1 and User 3, and an electronic communication via web forum involving User 1, User 3, and User 4. In response, user prompt program 110 displays flashing notification icon 312 in system tray 310.

Responsive to User 1 left-clicking flashing notification icon 312, user prompt program 110 displays communications management panel 314, which includes selectable elements 316 through 320. Selectable elements 316 through 320 each correspond to one of the related electronic communications, and User 1 can select (e.g., click) each of them to bring into active view the corresponding related communication. Selectable elements 316 through 320 also display to User 1 information about each of the related communications. As illustrated in this example, selectable elements 316 through 320 can display the electronic messaging medium and one or more other users involved in each of the related communications. Alternatively, selectable elements 316 through 320 can each be preview panes that provide small preview images of the corresponding related communications.

Responsive to User 1 right-clicking flashing notification icon 312, user prompt program 110 displays menu 322. Menu 322 includes menu option 324 and menu option 326. User 1 can select menu option 324 to initiate a synchronized electronic communication involving User 1, User 2, User 3, and User 4, as discussed with regard to FIG. 2. For example, upon selecting menu option 324, user prompt program 110 can display a graphical window containing options to transmit an e-mail message, instant message, or invitation for an electronic chat session or VOIP conference call to User 2, User 3, and User 4. User 1 can select menu option 326 to hide communications management panel 314, menu 322, and flashing notification icon 312.

FIG. 4 shows an illustration of a user interface operated by a hypothetical user to manage and synchronize related electronic communications in accordance with another embodiment of the present invention. The user interface depicted in FIG. 4 is based upon the same instant messaging window 304 and underlying example scenario discussed with regard to FIG. 3. Accordingly, for an explanation of the example scenario, instant messaging window 304, and message 306, please refer to the discussion of FIG. 3.

Here, in response to topic identification program 106 identifying the three related electronic communications, user prompt program 110 displays graphical notification window 402 in-line with message 306 (i.e., the message containing the common topic: Topic A). Graphical notification window 402 includes a suggested synchronized communication. For the purposes of this example, User 3 and User 4 do not exist in User 1's instant messaging contact list or e-mail address book, and user prompt program 110 identified that a web forum is an electronic communication medium that can be accessed by the users. User prompt program 110 has suggested sharing a link to web forum 404, which represents the related electronic communication via web forum involving User 1, User 3, and User 4. User 1 can select the "View" and "Share Link" hyperlinks 406 to open the related electronic communication (e.g., navigate to the URL link with web browsing software) or transmit a URL link to the other users, respectively. User 1 can select ignore button 408 to hide graphical notification window 402.

Figure 5:
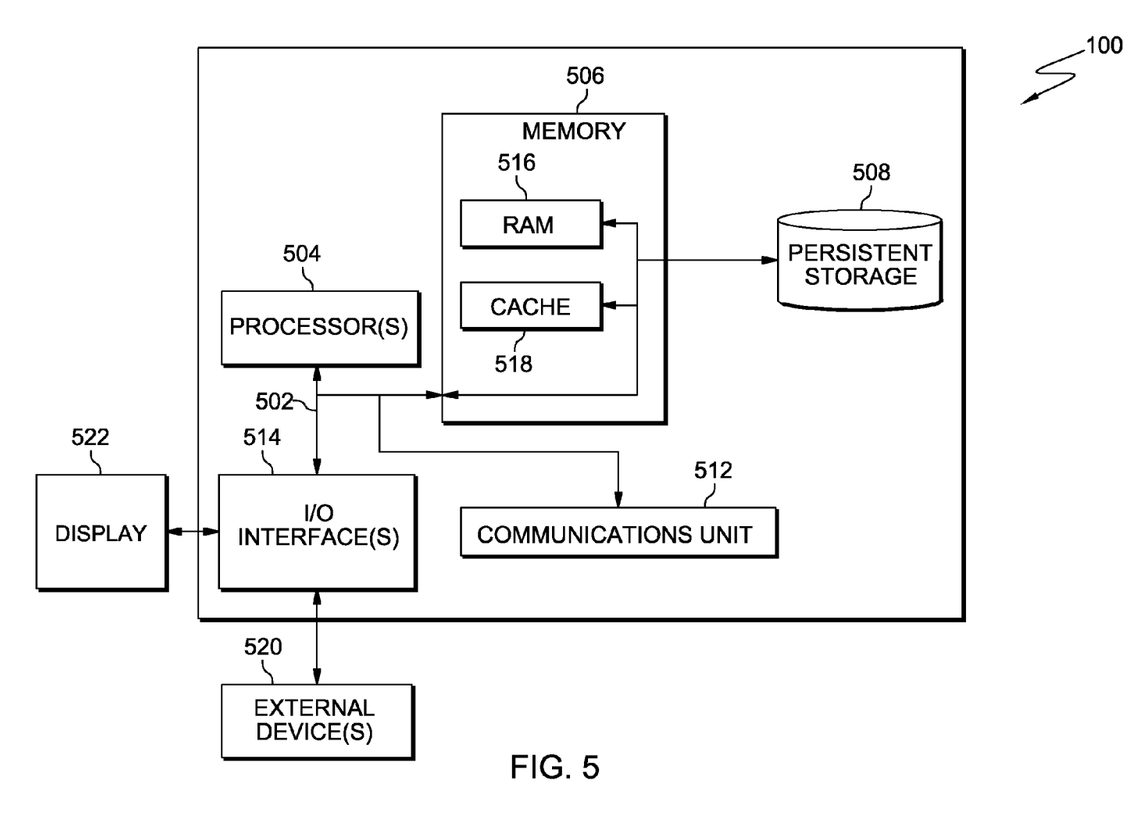
FIG. 5 is a block diagram of internal and external components of the computer system of FIG. 1 in accordance with an embodiment of the present invention.

FIG. 5 is a block diagram of internal and external components of computer system 100 in accordance with an embodiment of the present invention. It should be appreciated that FIG. 5 provides only an illustration of one implementation and does not imply any limitations with regard to the environments in which different embodiments may be implemented. Many modifications to the depicted environment may be made based on design and implementation requirements.

Computer system 100 is representative of any electronic device capable of executing machine-readable program instructions. Examples of computer systems, environments, and/or configurations that may be represented by computer system 100 include, but are not limited to, personal computer systems, server computer systems, thin clients, thick clients, laptop devices, tablet devices, cellular telephones, multiprocessor systems, microprocessor-based systems, network PCs, minicomputer systems, and distributed cloud computing environments that include any of the above systems or devices.

Computer system 100 includes one or more buses 502, which provide for communications between one or more processors 504, memory 506, persistent storage 508, communications unit 512, and one or more input/output (I/O) interfaces 514.

Memory 506 and persistent storage 508 are examples of computer-readable tangible storage media. Computer-readable tangible storage media are capable of storing information such as data, program code in functional form, and/or other suitable information on a temporary basis and/or permanent basis. One or more operating systems, one or more messaging clients 102, communication capture program 104, topic identification program 106, active communications data store 108, and user prompt program 110 are stored in persistent storage 508 for execution and/or access by one or more of the respective processors 504 via one or more memories of memory 506.

Memory 506 can include one or more random access memories (RAM) 516, cache memory 518, or any other suitable volatile or non-volatile storage medium. In the embodiment illustrated in FIG. 5, persistent storage 508 is a magnetic disk storage medium of an internal hard drive. Alternatively, persistent storage 508 can be a semiconductor storage device such as ROM, EPROM, flash memory or any other computer-readable storage device that can store a computer program and digital information. The media used by persistent storage 508 can also be removable. For example, a removable hard drive can be used for persistent storage 508. Other examples include optical or magnetic disks, thumb drives, or smart cards that are inserted into a drive for transfer onto another storage medium that is also a part of persistent storage 508.

Communications unit 512 provides for communications with other computer systems or devices via a network. In the embodiment illustrated in FIG. 5, communications unit 512 includes network adapters or interfaces such as a TCP/IP adapter cards, wireless Wi-Fi interface cards, or 3G or 4G wireless interface cards or other wired or wireless communication links. The network can comprise copper wires, optical fibers, wireless transmission, routers, firewalls, switches, gateway computers and/or edge servers. Software and data used to practice embodiments of the present invention can be downloaded to computer system 100 through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computer system 100. For example, I/O interface 514 can provide a connection to one or more external devices 520 such as a keyboard, computer mouse, touch screen, virtual keyboard, touch pad, pointing device, or other human interface devices. I/O interface 514 also connects to display 522.

Display 522 provides a mechanism to display data to a user of computer system 100 and can be, for example, a computer monitor. Alternatively, display 522 can be an incorporated display and may also function as a touch screen, such as, for example, a display of a tablet computer that also functions as a touch screen.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "system." Furthermore, aspects of the present invention may take the form of a computer program product embodied in one or more computer-readable media having computer-readable program code embodied thereon.

Any combination of one or more computer-readable media may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

The aforementioned programs can be written in any combination of one or more programming languages, including low-level, high-level, object-oriented or non object-oriented languages, such as Java®, Smalltalk, C, and C++. The program code may execute entirely on computer system 100, partly on computer system 100, partly on computer system 100 and partly on a remote computer, or entirely on a remote computer or server. In the latter scenario, the remote computer may be connected to computer system 100 through any type of network, including a local area network or a wide area network. Alternatively, the functions of the aforementioned programs can be implemented in whole or in part by computer circuits and other hardware (not shown).

The foregoing description of various embodiments of the present invention has been presented for purposes of illustration and description. It is not intended to be exhaustive nor limit the invention to the precise form disclosed. Many modifications and variations of the present invention are possible.

Such modifications and variations that may be apparent to a person skilled in the art of the invention are intended to be included within the scope of the invention as defined by the accompanying claims.

What is claimed is:

1. A method for managing and synchronizing electronic communications having a common topic, the method comprising:
   a computer system detecting a first electronic communication on a first electronic communication medium involving a first user and a first set of one or more users;
   the computer system analyzing message content of the first electronic communication to identify a first topic of the first electronic communication;
   the computer system detecting a second electronic communication on a second electronic communication medium involving the first user and a second set of one or more users that has been brought into active view on a user interface of the computer system, wherein the first set of one or more users and the second set of one or more users are each a different set of one or more users;
   the computer system analyzing message content of the second electronic communication to identify a second topic of the second electronic communication;
   the computer system determining whether the first topic matches the second topic;
   the computer system determining that at least one user of the second set of one or more users does not exist in a first contact list associated with the first electronic communication medium and that at least one user of the first set of one or more users does not exist in a second contact list associated with the second electronic communication medium;
   the computer system identifying a third electronic communication medium that can be accessed by the first user, the first set of one or more users, and the second set of one or more users, based on electronic communication mediums known to be accessible to the first user, the first set of one or more users, and the second set of one or more users; and
   responsive to the first topic matching the second topic, the computer system providing to the first user an option to initiate a third electronic communication in the third electronic communication medium involving the first user, the first set of one or more users, and the second set of one or more users, wherein the first electronic communication medium, the second electronic communication medium, and the third electronic communication medium are each a different type of electronic communication medium.

2. The method of claim 1, wherein the first electronic communication medium and the second electronic communication medium are each selected from the group consisting of: an e-mail message, an instant message, an electronic chat session, a web forum, a SMS text message, and a MMS text message.

3. The method of claim 1, further comprising the steps of:
   the computer system receiving an indication to initiate the third electronic communication; and
   the computer system initiating the third electronic communication, wherein the computer system initiating the third electronic communication includes the computer system transmitting a means to access the third electronic communication to the first and second sets of one or more users.

4. The method of claim 3, wherein the step of the computer system initiating the third electronic communication further comprises:
   the computer system populating the third electronic communication with a first message content from the first electronic communication, wherein the first message content is at least a portion of message content of the first electronic communication pertaining to the first topic; and
   the computer system populating the third electronic communication with a second message content from the second electronic communication, wherein the second message content is at least a portion of message content of the second electronic communication pertaining to the second topic.

5. The method of claim 1, wherein the step of the computer system providing to the first user an option to initiate the third electronic communication in the third electronic communication medium involving the first user, the first set of one or more users, and the second set of one or more users comprises:
   the computer system causing a graphical notification prompt to be displayed in-line with a section of the first electronic communication containing text pertaining to the first topic, wherein the graphical notification prompt includes an option to initiate the third electronic communication in the third electronic communication medium.

6. The method of claim 1, wherein the step of the computer system providing to the first user an option to initiate the third electronic communication in the third electronic communication medium involving the first user, the first set of one or more users, and the second set of one or more users comprises:
   the computer system causing a tray notification prompt to be displayed, wherein selection of the tray notification prompt causes a pop-up prompt to be displayed, wherein the pop-up prompt includes information about the first communication, information about the second communication, and an option to initiate the third electronic communication in the third electronic communication medium.

7. The method of claim 1, further comprising:
   the computer system storing communication data of the first electronic communication, including at least the first topic, to a data store, wherein the data store includes an ongoing record of electronic communications with the first user;
   the computer system storing communication data of the second electronic communication, including at least the second topic, to the data store.

8. The method of claim 7, further comprising:
   the computer system determining that the communication data of the first electronic communication has been stored longer than a specified time limit; and
   responsive to determining that the communication data of the first electronic communication has been stored longer than the specified time limit, the computer system removing the communication data of the first electronic communication.

9. The method of claim 8, wherein the specified time limit is based on, at least, a number of occurrences of electronic communications pertaining to the first topic.

10. A computer system for managing and synchronizing electronic communications having a common topic, the computer system comprising:

one or more processors, one or more computer-readable memories, one or more computer-readable storage media, and program instructions stored on at least one of the one or more computer-readable storage media for execution by at least one of the one or more processors via at least one of the one or more computer-readable memories, the program instructions comprising:

program instructions to detect a first electronic communication on a first electronic communication medium involving a first user and a first set of one or more users;

program instructions to analyze message content of the first electronic communication to identify a first topic of the first electronic communication;

program instructions to detect a second electronic communication on a second electronic communication medium involving the first user and a second set of one or more users that has been brought into active view on a user interface of the computer system, wherein the first set of one or more users and the second set of one or more users are each a different set of one or more users;

program instructions to analyze message content of the second electronic communication to identify a second topic of the second electronic communication;

program instructions to determine whether the first topic matches the second topic;

program instructions to determine that at least one user of the second set of one or more users does not exist in a first contact list associated with the first electronic communication medium and that at least one user of the first set of one or more users does not exist in a second contact list associated with the second electronic communication medium;

program instructions to identify a third electronic communication medium that can be accessed by the first user, the first set of one or more users, and the second set of one or more users, based on electronic communication mediums known to be accessible to the first user, the first set of one or more users, and the second set of one or more users; and program instructions to, responsive to the first topic matching the second topic, provide to the first user an option to initiate a third electronic communication in the third electronic communication medium involving the first user, the first set of one or more users, and the second set of one or more users, wherein the first electronic communication medium, the second electronic communication medium, and the third electronic communication medium are each a different type of electronic communication medium.

11. The computer system of claim 10, wherein the first electronic communication medium and the second electronic communication medium are each selected from the group consisting of: an e-mail message, an instant message, an electronic chat session, a web forum, a SMS text message, and a MMS text message.

12. The computer system of claim 10, further comprising:
program instructions, stored on the computer-readable storage media for execution by at least one of the one or more processors, to receive an indication to initiate the third electronic communication; and
program instructions, stored on the computer-readable storage media for execution by at least one of the one or more processors, to initiate the third electronic communication, wherein the program instructions to initiate the third electronic communication include program instructions to transmit a means to access the third electronic communication to the first and second sets of one or more users.

13. The computer system of claim 12, wherein program instructions to initiate the third electronic communication further comprise:
program instructions to populate the third electronic communication with a first message content from the first electronic communication, wherein the first message content is at least a portion of message content of the first electronic communication pertaining to the first topic; and
program instructions to populate the third electronic communication with a second message content from the second electronic communication, wherein the second message content is at least a portion of message content of the second electronic communication pertaining to the second topic.

14. The computer system of claim 10, wherein program instructions to provide to the first user an option to initiate the third electronic communication in the third electronic communication medium involving the first user, the first set of one or more users, and the second set of one or more users comprise:
program instructions to cause a graphical notification prompt to be displayed in-line with a section of the first electronic communication containing text pertaining to the first topic, wherein the graphical notification prompt includes an option to initiate the third electronic communication in the third electronic communication medium.

15. The computer system of claim 10, wherein program instructions to provide to the first user an option to initiate the third electronic communication in the third electronic communication medium involving the first user, the first set of one or more users, and the second set of one or more users comprise:
program instructions to cause a tray notification prompt to be displayed, wherein selection of the tray notification prompt causes a pop-up prompt to be displayed, wherein the pop-up prompt includes information about the first communication, information about the second communication, and an option to initiate the third electronic communication in the third electronic communication medium.

16. A computer program product for managing and synchronizing electronic communications having a common topic, the computer program product comprising:
one or more computer-readable hardware storage media and program instructions stored on at least one of the one or more computer-readable hardware storage media, the program instructions comprising:
program instructions to detect a first electronic communication on a first electronic communication medium involving a first user and a first set of one or more users;
program instructions to analyze message content of the first electronic communication to identify a first topic of the first electronic communication;
program instructions to detect a second electronic communication on a second electronic communication medium involving the first user and a second set of one or more users that has been brought into active view on a user interface of the computer system, wherein the first set of one or more users and the second set of one or more users are each a different set of one or more users;

program instructions to analyze message content of the second electronic communication to identify a second topic of the second electronic communication;

program instructions to determine whether the first topic matches the second topic;

program instructions to determine that at least one user of the second set of one or more users does not exist in a first contact list associated with the first electronic communication medium and that at least one user of the first set of one or more users does not exist in a second contact list associated with the second electronic communication medium;

program instructions to identify a third electronic communication medium that can be accessed by the first user, the first set of one or more users, and the second set of one or more users, based on electronic communication mediums known to be accessible to the first user, the first set of one or more users, and the second set of one or more users; and program instructions to, responsive to the first topic matching the second topic, provide to the first user an option to initiate a third electronic communication in the third electronic communication medium involving the first user, the first set of one or more users, and the second set of one or more users, wherein the first electronic communication medium, the second electronic communication medium, and the third electronic communication medium are each a different type of electronic communication medium.

17. The computer program product of claim 16, wherein the first electronic communication medium and the second electronic communication medium are each selected from the group consisting of: an e-mail message, an instant message, an electronic chat session, a web forum, a SMS text message, and a MMS text message.

18. The computer program product of claim 16, further comprising:

program instructions, stored on the one or more computer-readable hardware storage media, to receive an indication to initiate the third electronic communication; and program instructions, stored on the one or more computer-readable hardware storage media, to initiate the third electronic communication, wherein the program instructions to initiate the third electronic communication include program instructions to transmit a means to access the third electronic communication to the first set of one or more users and the second set of one or more users.

19. The computer program product of claim 18, wherein program instructions to initiate the third electronic communication further comprise:

program instructions to populate the third electronic communication with a first message content from the first electronic communication, wherein the first message content is at least a portion of message content of the first electronic communication pertaining to the first topic; and program instructions to populate the third electronic communication with a second message content from the second electronic communication, wherein the second message content is at least a portion of message content of the second electronic communication pertaining to the second topic.

20. The computer program product of claim 16, wherein program instructions to provide to the first user an option to initiate the third electronic communication in the third electronic communication medium involving the first user, the first set of one or more users, and the second set of one or more users comprise:

program instructions to cause a graphical notification prompt to be displayed in-line with a section of the first electronic communication containing text pertaining to the first topic, wherein the graphical notification prompt includes an option to initiate the third electronic communication in the third electronic communication medium.

* * * * *